Nov. 3, 1925.  
R. L. GRIFFIN  
1,560,421  
VALVE GEAR OPERATING MECHANISM  
Filed Dec. 28, 1923

Inventor  
Ransom L. Griffin  
By Shanks Ackerman  
Attorney

Patented Nov. 3, 1925.

UNITED STATES PATENT OFFICE.

RANSOM L. GRIFFIN, OF SANFORD, FLORIDA.

VALVE-GEAR-OPERATING MECHANISM.

Application filed December 28, 1923. Serial No. 683,224.

*To all whom it may concern:*

Be it known that I, RANSOM L. GRIFFIN, a citizen of the United States of America, and resident of Sanford, in the county of Seminole and State of Florida, have invented certain new and useful Improvements in Valve-Gear-Operating Mechanism, of which the following is a specification.

This invention relates to valve gear operating mechanism, and has for an object the provision of novel means for moving the valve gear of any kind of a locomotive from a forward position to a reverse position, or to a neutral position therebetween; the said invention being a manually operated valve gear shift that is positive in operation and requires comparatively little power for its actuation.

It is a further object of this invention to produce a gear shift of the character indicated that can be installed on locomotives, and in which the manually operated device is so located as to be within convenient reach of the engine cab window, in order that the engineer may control the gear from that position.

It is a further object of this invention to produce a shifting mechanism of the character indicated which will possess durability and to provide gears which are capable of being shifted to bring new parts of said gears into operative relation with one another in order that its durability may be insured.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1:
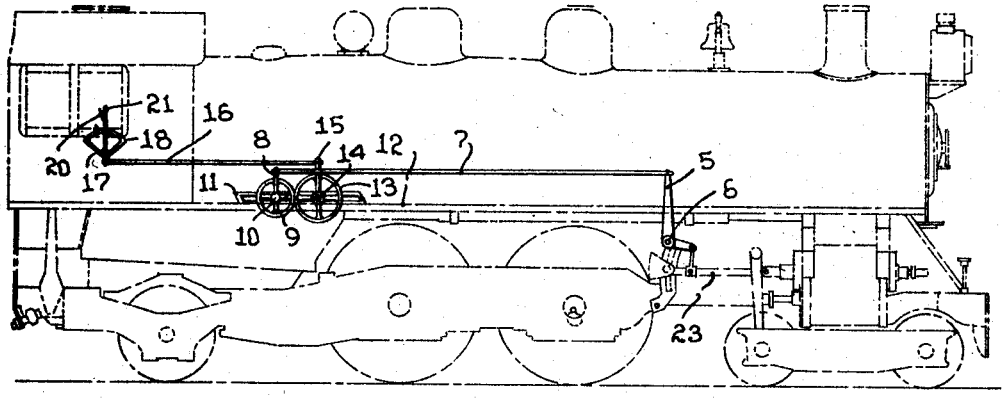
Figure 1 illustrates a view in elevation of a gear shifting mechanism installed in operative relation to the valve gear of a locomotive of conventional type.

In these drawings, 5 denotes a bell crank lever that is oscillatably mounted on a stud 6. The long or upper arm of the bell crank lever has a rod 7 pivotally connected to it, and the said rod extends rearwardly to an arm 8 that is rigidly connected to the hub of a gear wheel 9, the said gear wheel being rotatable on a stub shaft 10 carried by a bracket 11. The bracket may be of any appropriate type, capable of being secured to a running board 12 of a locomotive, and preferably these parts are located in proximity to the front end of the cab.

A gear wheel 13 meshes with the gear wheel 9 and it is rotatably mounted on a shaft 14 carried by the bracket 11 so that the said wheels may be maintained in mesh with each other while in operation. An arm 15 is connected to the wheel 13, and the said arm 15 is pivotally connected to a link 16 that extends rearwardly and is pivotally connected to an operating lever 17, that is oscillatably mounted on a quadrant 18. The quadrant has teeth adapted to be engaged by a detent 19, and the detent is under the control of a lever 20 that is pivoted on the upper end of the lever 17 in proximity to the handle 21 on the said lever 17 in order that the lever may be oscillated for the purpose of changing the valve mechanism of a locomotive.

Figure 2:
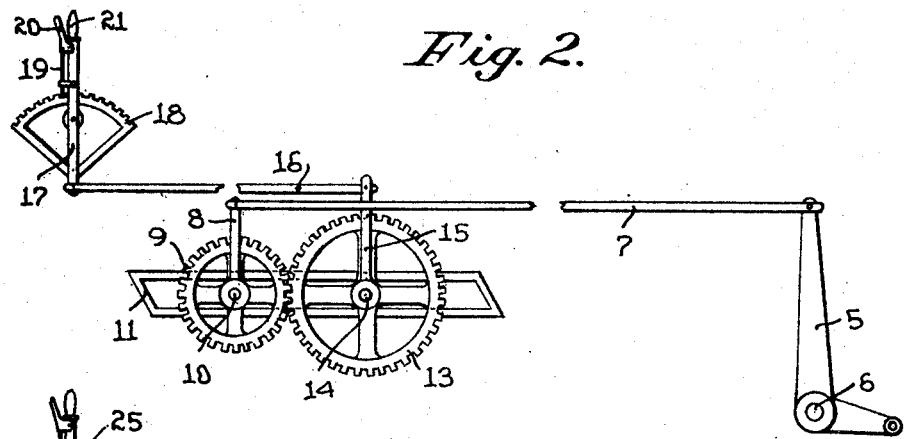
Figure 2 illustrates an enlarged detail view of the shifting mechanism.
Figure 2:
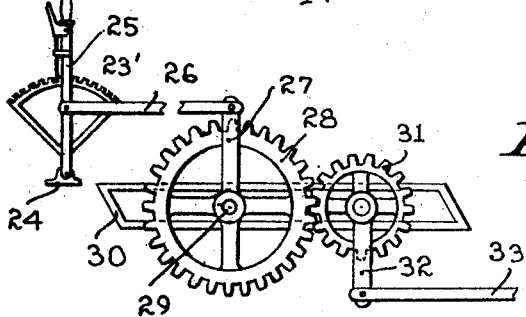

From an inspection of the drawing and especially Fig. 2, it will be apparent that as the lever 17 is moved by the engineer, the arm 5 can be thrown rearwardly or forwardly and this, in turn, will partially rotate the intermeshing gear wheels 13 and 9. The partial rotation of the wheel 9 will oscillate the arm 8 and move the rod 7 in order that the bell crank lever may be oscillated and the short arm of the lever 5 will communicate motion to the valve mechanism through means of a link connection 22 between the short end of the bell crank lever 5 and the link slide valve rod. The link 23 is connected to a slide block which is movable in a segment.

As arranged in Figs. 1 and 2, the rod 7 passes the arm 15 and is connected to the arm 8 of the smaller gear wheel 9.

Figure 3:
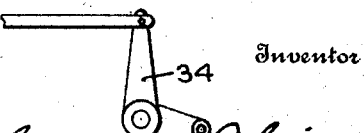
Figure 3 illustrates a similar view embodying a slight modification.

In the embodiment of the invention shown in Fig. 3, the quadrant 23′ is associated with a support 24 for the lever 25 and means are provided for holding the lever at different positions of adjustment. A link 26 is pivotally connected to said lever at a point between its ends, and the said link is pivotally connected to the upper end of an arm 27 that partially rotates the wheel 28, that is rotatable on a stub shaft 29 which extends from the bracket 30. A smaller gear wheel 31 meshes with the gear wheel 28, and the depending arm 32 is connected to the gear wheel 31 and has a rod or link 33 pivoted to it, which rod or link is also pivotally connected to a bell crank lever 34 which operates in the same manner as the bell crank lever 5. The bell crank lever 34 being connected directly to the smaller gear wheel may have a smaller bell crank to provide for other types of link motions, as in the form shown in Fig. 3, the motion of the lever is communicated to the arm 32 in a reverse direction to that in which the lever 17 communicates motion to the arm 8, and these relations of parts may be changed to suit particular requirements and the form that is regarded as more convenient for the particular installation, as when the arm of the bell crank 34 is short as compared with the arm 5 shown by the other figures of the drawings.

In the illustration in Fig. 1, the wheels 9 and 13 are shown on rather a small scale and therefore the teeth are omitted, but it is understood that the teeth shall be meshed, as by this means they are more positive in their operation.

It is the purpose of the inventor that the gear wheels may have their positions changed in order that other gear teeth may be brought into operation, should any of them become worn, and by reason of this interchangeable provision, they can be used throughout their circumference, and their length of service will therefore be greatly increased.

The functions of the different elements of the device have been stated in connection with a description of the elements, but in order that the advantages of the invention may be better understood, it may be stated that through the employment of the bell crank 5, which locomotive engineers term a "tumbling shaft arm", and the gear connections between it and the operating lever, the parts may be held at different positions of adjustment without undue strain on the operating parts and the mechanism can be operated for shifting the valve gear with slight effort and the gearing may be moved from neutral to forward or reverse positions and the throw imparted to the steam controlling valve may be minutely regulated from a single lever.

I claim:

1. In a shift for valve gear, a shaft arm adapted to communicate motion to the valve gear of a locomotive, a rigid member pivotally connected to the arm, a rotatably mounted gear wheel, means for connecting the gear wheel to the member for reciprocating the said member as the gear wheel partially rotates in different directions, a gear wheel rotatably mounted and meshing with the first mentioned gear wheel, a reciprocating member connected to the second mentioned gear wheel and adapted to partially rotate the same in opposite directions, and means for imparting motion to the last mentioned reciprocating member.

2. In a shift for valve gear, a bell crank lever adapted to be oscillatably mounted in operative relation to a gear shift of a locomotive, means for connecting one arm of the bell crank lever to said shifting means, a member pivotally connected to the other arm of the bell crank lever and extending rearwardly, an arm to which the rear end of the member is pivotally connected, a rotatably mounted member to which the arm is connected for oscillating the arm, a rotatably mounted member engaging the first rotatably mounted member for communicating motion thereto, an arm connected to the second mentioned rotatably mounted member, a rigid element pivotally connected to the last mentioned arm, and a manually operated lever to which the opposite end of the member is pivotally connected.

3. In a shifting mechanism for valve gear, a device for raising and lowering the lock of a valve gear, a manually operated lever, rotatably mounted wheels interposed between the manually operated lever and the shifting mechanism having means for communicating motion one to the other a reciprocating connection between the manually operated lever and one of the wheels whereby the wheel is partially rotated, and means connecting the other wheel to the shifting mechanism whereby motion of the gear wheels is communicated thereto.

RANSOM L. GRIFFIN.